(12) United States Patent  
Motomiya et al.

(10) Patent No.: US 7,489,975 B2  
(45) Date of Patent: Feb. 10, 2009

(54) POWER SUPPLY DEVICE, INFORMATION PROCESSING APPARATUS, AND POWER CONTROL METHOD

(75) Inventors: Hirohito Motomiya, Saitama-Ken (JP); Shizuo Morioka, Saitama-Ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 314 days.

(21) Appl. No.: 11/443,281

(22) Filed: May 31, 2006

(65) Prior Publication Data

US 2006/0268977 A1 Nov. 30, 2006

(30) Foreign Application Priority Data

May 31, 2005 (JP) .............................. 2005-159569

(51) Int. Cl.
*G06F 19/00* (2006.01)

(52) U.S. Cl. ........................... 700/22; 700/286; 314/266

(58) Field of Classification Search ................. 700/286, 700/22; 388/803, 800, 804, 816, 34; 361/688, 361/687; 323/283; 318/266, 286, 434, 469
See application file for complete search history.

(56) References Cited

U.S. PATENT DOCUMENTS 5,075,608 A * 12/1991 Erdman et al. ............... 318/599
6,204,650 B1 * 3/2001 Shimamori ................. 323/283
6,714,891 B2 * 3/2004 Dendinger .................. 702/132
6,911,808 B1 * 6/2005 Shimamori ................. 323/283
6,949,823 B2 * 9/2005 Schott et al. ................ 257/707
7,283,733 B2 * 10/2007 Chiu et al. .................. 388/804
7,336,113 B2 * 2/2008 Laletin ....................... 327/175

FOREIGN PATENT DOCUMENTS

JP         10-002248        1/1998
JP         2003-079136       3/2003

* cited by examiner

*Primary Examiner*—Kidest Bahta
(74) *Attorney, Agent, or Firm*—Pillsbury Winthrop Shaw Pittman, LLP

(57) ABSTRACT

A power supply apparatus includes a power converting unit for switching DC power on the basis of a pulse signal having a predetermined ON-pulse time and a predetermined pulse period, as pulse elements, thereafter smoothing the switched power, and outputting a predetermined power voltage, a control unit for calculating a new pulse-element on the basis of an output of the power converting unit, and a pulse generating unit for generating a pulse signal on the basis of the new pulse-element instructed from the control unit. The pulse generating unit generates the pulse signal of the new pulse-element from the instructed timing without waiting for a next pulse-period, even if the timing for instructing the new pulse-element from the control unit is any timing during the pulse period, irrespective of the ON-pulse time and an OFF-pulse time.

8 Claims, 8 Drawing Sheets

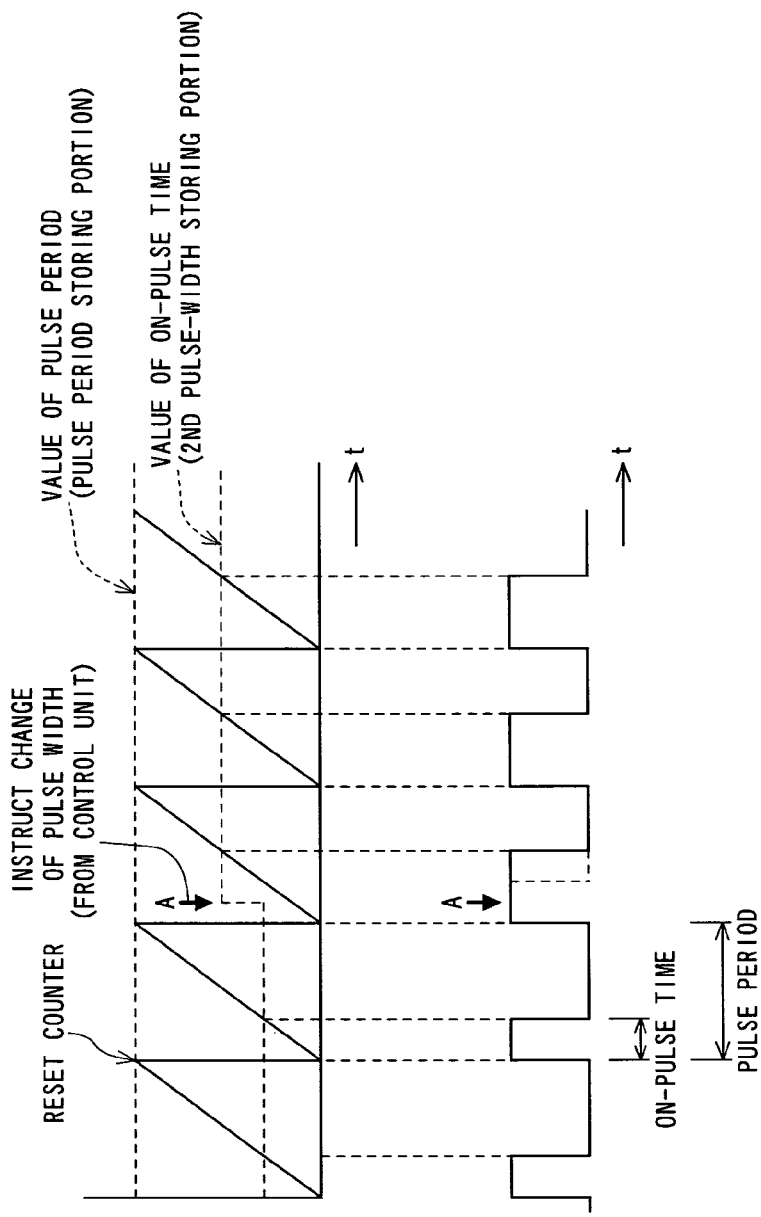

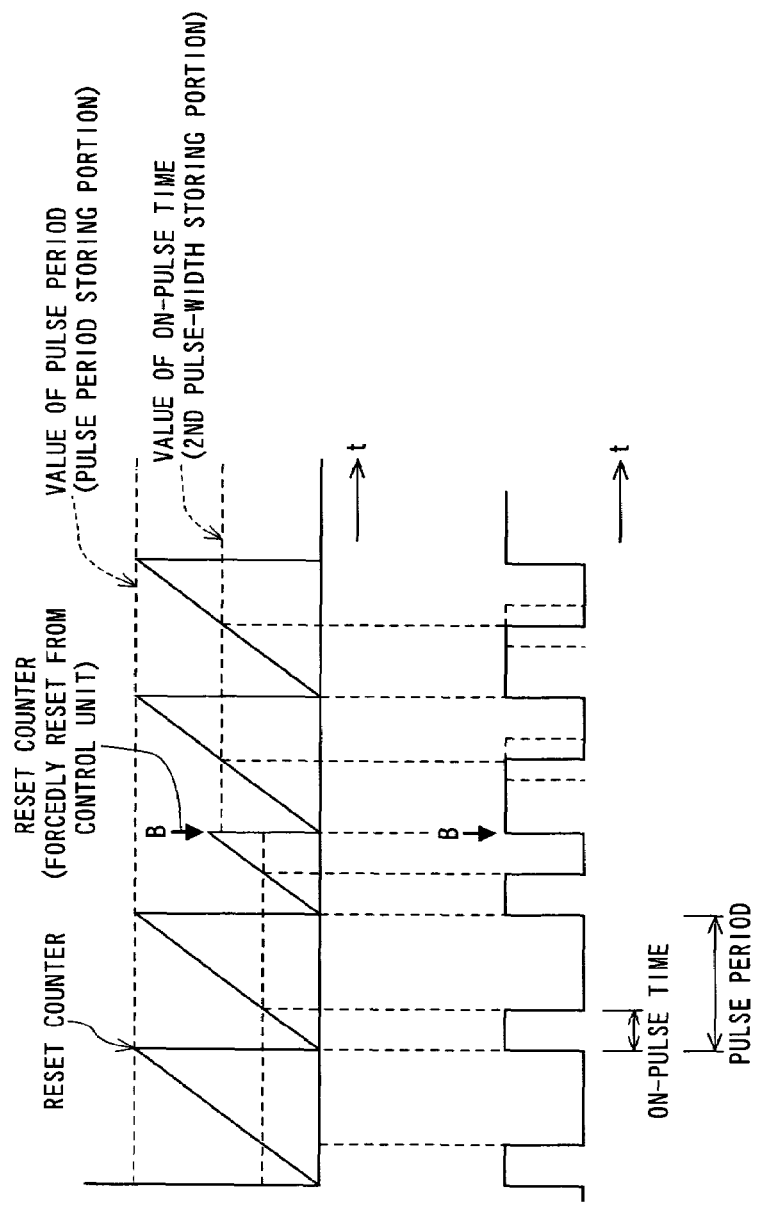

POWER SUPPLY DEVICE, INFORMATION PROCESSING APPARATUS, AND POWER CONTROL METHOD

CROSS-REFERENCE TO RELATED APPLICATIONS

This application claims the benefit of priority of Japanese Patent Application No. 2005-159569, filed May 31, 2005, the entire contents of which are incorporated herein by reference.

BACKGROUND

1. Field

The present invention relates to a power supply device, an information processing apparatus, and a power control method. In particular, the present invention relates to a power supply device that controls a voltage or the like under the control of a pulse width, and an information processing apparatus including the power supply device, and a power control method.

2. Description of the Related Art

A power supply device, such as a power supply device for DC/DC conversion, conventionally uses a technology for controlling an output voltage or output power under the control of a pulse width or a duty ratio in many cases.

In the power supply device for DC/DC conversion, DC power is input to a switching element, such as an FET, the input power is switched with a pulse signal having a predetermined duty ratio, the power is thereafter smoothed, and DC power with a desired voltage is output. Since an output voltage can be easily controlled by the duty ratio of the pulse signal applied to the switching element, the power supply device for DC/DC conversion is used as a power supply of an information processing apparatus in many cases.

Further, in power supply devices for DC/DC conversion, even when a load is changed, the duty ratio (or pulse width) of the pulse signal is controlled in real time to continuously keep the output voltage to be constant.

The power supply device for DC/DC conversion having a control function with the duty ratio (or pulse width) requires high control-responsiveness to the change in load.

For example, Jpn Pat Publication No. 10-2248 discloses a technology for realizing the high control-responsiveness under the control of the duty ratio of current with an electric load, and the technology relates to an energization control apparatus similar to the power supply device for DC/DC conversion.

Generally, the power supply device for DC/DC conversion for controlling the duty ratio or pulse width uses such a method that an output voltage is monitored, a new duty-ratio or pulse-width is calculated from the monitored output voltage, and the calculated pulse-period or pulse-width is set to a register in a predetermined pulse-generating circuit, the new pulse-signal is thus generated, and the output voltage is sequentially updated and controlled by switching DC power with the new pulse-signal.

With the conventional power supply device for DC/DC conversion, even if the new pulse-width or pulse-period is calculated, actually, a new pulse signal based on them can be generated in the next pulse-period or the pulse-period subsequent thereto.

Further, in order to calculate the new pulse-width or pulse-period from the monitored output voltage at the current pulse period and apply the calculated pulse period to a next one, calculating processing and setting processing to the register in the pulse generating circuit is necessary within the pulse period. When a processing speed is not sufficient, the pulse period is necessarily long.

As mentioned above, with the conventional technology, a response is delayed from the time for calculating the new pulse-width or duty-ratio on the basis of the change in voltage to the time for actually generating a pulse waveform having a new pulse-width or duty-ratio.

Jpn Pat Publication No. 10-2248 discloses a technology for updating the pulse width within the pulse period as much as possible in order to improve the above-mentioned responsive delay. Although the technology disclosed in Jpn Pat Publication No. 10-2248 is improved to some degree, as compared with the conventional technology, the new pulse-width is not realized without the responsive delay from a changing instruction of the pulse width. Further, in the case that the changing instruction of the pulse width is issued during an ON-pulse time, the new pulse-width cannot be realized until the next pulse-period.

On the other hand, the improvement in responsiveness of the power supply device for DC/DC conversion is increasingly demanded. The recent fast improvement in information-processing speed results not only in increase in consumption power of a CPU but also in increase in changing rate of consumption current varying depending on the operation of the CPU. In order to prevent the fall in power voltage due to the abrupt increase in consumption current, a large-scaled-capacitor needs to be provided for a peripheral power circuit of the CPU.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIGS. 7A and 7B are explanatory diagrams of a method for generating a pulse signal with a new pulse-width during an ON-pulse time; and FIGS. 8A and 8B are explanatory diagrams of a method for generating a pulse signal with a new pulse-width during an OFF-pulse time.

DETAILED DESCRIPTION

Hereinbelow, a description is given of a power supply device, an information processing apparatus including the power supply device, and a power control method according to an embodiment of the present invention with reference to the drawings.

(1) Structure of Information Processing Apparatus and power supply device

Figure 1:
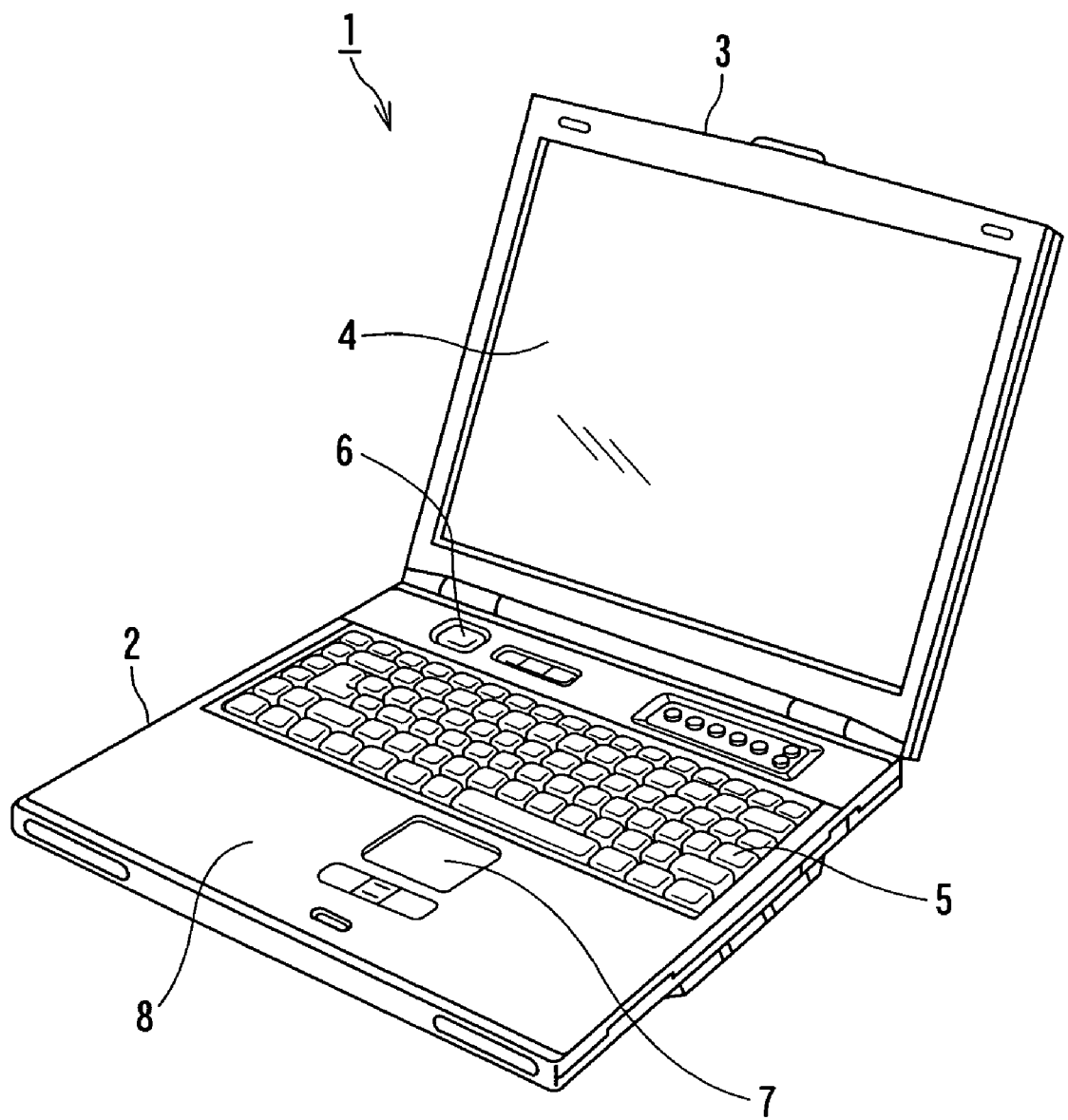
FIG. 1 is a diagram showing an example of the appearance of an information processing apparatus according to an embodiment of the present invention.

FIG. 1 is a diagram showing an example of the appearance of a notebook-type personal computer (information processing apparatus 1) as an example of an information processing apparatus including a power supply device according to an embodiment of the present invention.

The information processing apparatus 1 includes a main body unit 2, and a panel unit 3.

The main body unit 2 includes a flat box-shaped casing 8. The casing 8 has, on the top surface thereof, a power switch 6 and operating devices, such as a keyboard 5 and a touch pad 7.

Further, the casing 8 has components including a CPU 22 for performing various information processing and a memory device 23. Furthermore, the casing 8 comprises a power supply device 10 for supplying power to the components.

The panel unit 3 is closably connected to the main body unit 2 via a hinge (not shown) at the rear end of the main body unit 2. The panel unit 3 comprises a liquid crystal display 4 that displays an image and various kinds of information, such as character information.

Figure 2:
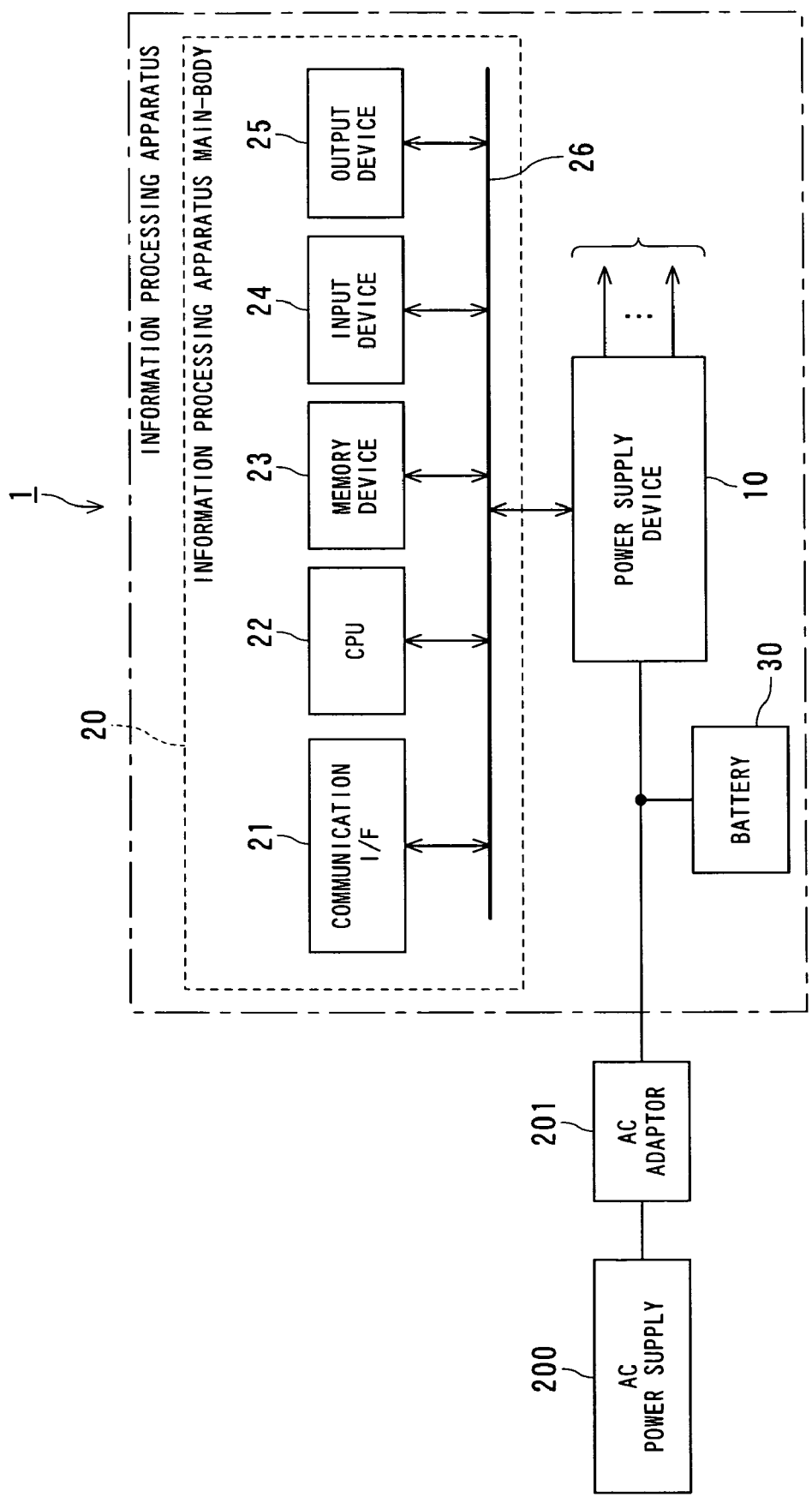
FIG. 2 is a block diagram showing an example of the system structure of the information processing apparatus according to the embodiment of the present invention.

FIG. 2 is a block diagram showing an example of the system structure of the information processing apparatus 1 according to the embodiment.

The information processing apparatus 1 includes an information processing apparatus main-body 20 that performs various information processing, and a power supply device 10 that supplies predetermined power to components of the information processing apparatus main-body 20.

Predetermined DC power is supplied to the power supply device 10 via an AC adaptor 201 from an external AC power supply 200. The information processing apparatus 1 includes a battery 30, and DC power is also supplied to the power supply device 10 from the battery 30.

The information processing apparatus main-body 20 includes a CPU 22 that functions as a core of entirely controlling the information processing apparatus 1. Further, the information processing apparatus main-body 20 includes a ROM (not shown) that stores a program executed by the CPU 22, a RAM (not shown) that functions as a work area of the CPU 22, and a memory device 23 including an HDD.

Further, the information processing apparatus main-body 20 has an input device 24 including the keyboard 5 and a touch pad 7, an output device 25 including the liquid crystal display 4, and a communication interface 21 that receives and transmits data to/from an external communication line.

The power supply device 10 supplies DC power with a predetermined voltage to the components of the information processing apparatus main-body 20. In the components, the consumption current changes in accordance with the operating state. Even if the consumption current changes as mentioned above, the voltage of the DC power supplied from the power supply device 10 needs to be held within a predetermined reference-range so as to keep the functions and the performance of the components.

Therefore, the power supply device 10 according to the embodiment monitors an output value of the power supply device 10, and controls the operation for holding an output voltage within a predetermined reference range.

Figure 3:
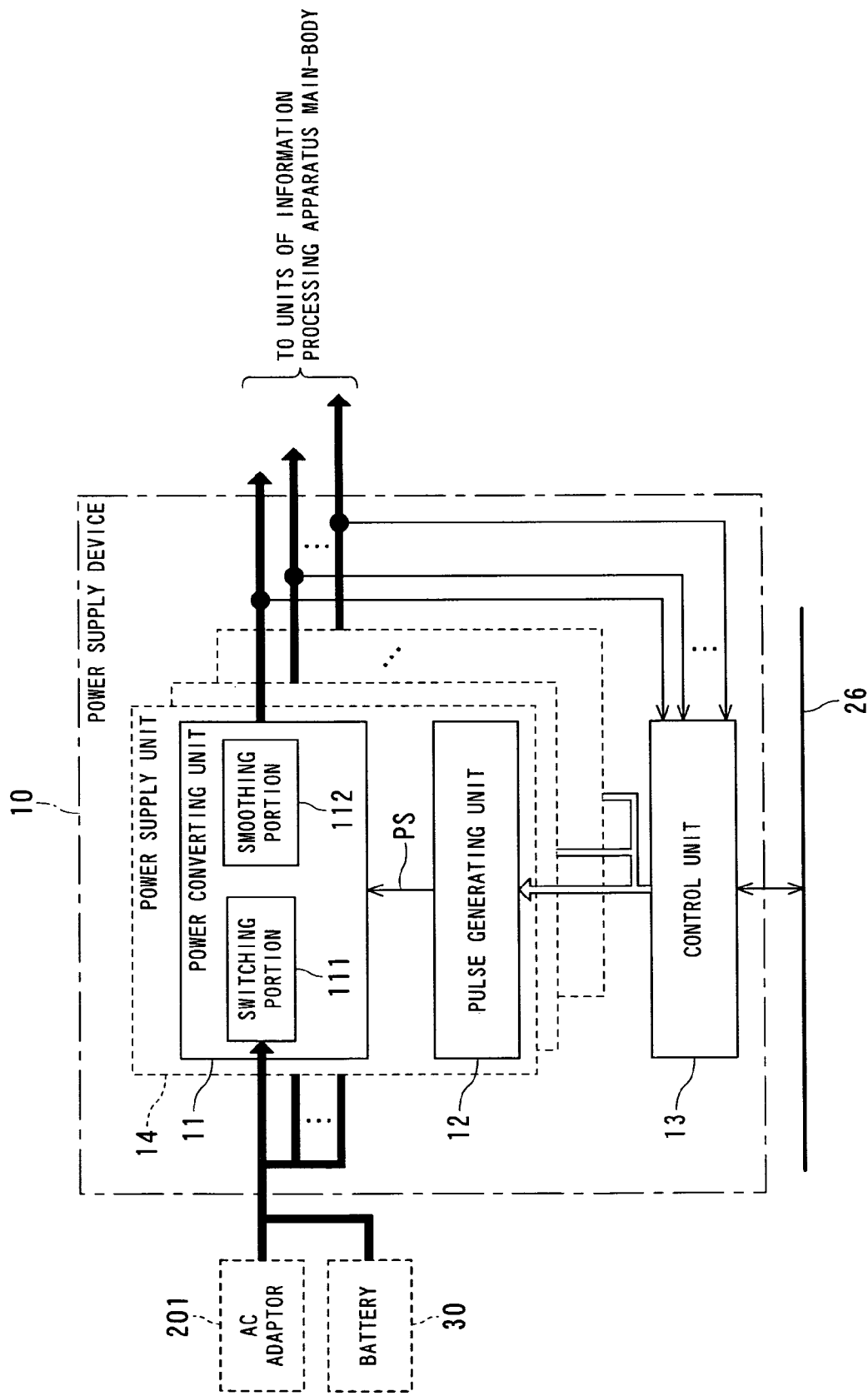
FIG. 3 is a diagram showing an example of the structure of a power supply device according to the embodiment of the present invention.

FIG. 3 is a diagram showing an example of the structure of the power supply device 10 according to the embodiment. The power supply device 10 includes a power supply unit 14, and a control unit 13.

Referring to FIG. 3, a plurality of the power supply units 14 are arranged when the power voltage to supply is different or when the power capacity of the load is large.

The power supply unit 14 receives the DC power supplied from the AC adaptor 201 or the battery 30, converts the DC power into a predetermined power voltage, and supplies the converted voltage to the components of the information processing apparatus main-body 20.

The power supply unit 14 has a power converting unit 11, and the pulse generating unit 12.

The power converting unit 11 has a switching portion 111 that switches DC-power input on the basis of a pulse signal PS supplied from the pulse generating unit 12, and a smoothing portion 112 that smoothes the switched power.

The switching portion 111 includes a switching element, such as an FET. The smoothing portion 112 includes a smoothing coil and a capacitor, and smoothes the pulse-switched power and outputs DC power with a stable voltage.

The pulse generating unit 12 generates a pulse signal PS on the basis of pulse elements (pulse width and pulse period) instructed from the control unit 13. As the duty ratio of the pulse (value obtained by dividing the pulse width by the pulse period) of the pulse signal is higher, or as the pulse width is larger when the pulse period is constant, a voltage value of the DC power output from the power converting unit 11 is higher. On the other hand, as the duty ratio of the pulse width is lower or as the pulse width is smaller, a voltage value of the DC power output from the power converting unit 11 is lower.

Therefore, the voltage value of the DC power can be controlled by changing the duty ratio or the pulse width of the pulse signal PS generated by the pulse generating unit 12.

As will be described later, the pulse generating unit 12 according to the embodiment immediately generates the pulse signal PS on the basis of the pulse width instructed from the control unit 13 without delay from the instructed timing, and the voltage value can be controlled with excessively high responsiveness.

The control unit 13 basically controls the power, e.g., the on/off operation of power to the power supply units 14, and further controls the operation for stabilizing the voltage of the power supply units 14.

The control unit 13 according to the embodiment uses software control having a DSP, and enables the complicated control with high flexibility and also realizes the compact size.

Specifically, an A/D converter (not shown) of the power supply unit 14 monitors the output of the power supply unit 14. The best pulse width is calculated by the comparison with the reference voltage value, and the calculated pulse width is instructed to the pulse generating unit 12 in the power supply unit 14. The processing is performed to a plurality of power supply units 14 in parallel. In addition, the instruction from the information processing apparatus main-body 20 is received via a bus 26, the basic power-control, such as the on/off operation of power, is performed, and it is also monitored whether or not the power supply unit 14 is abnormal.

Figure 4:
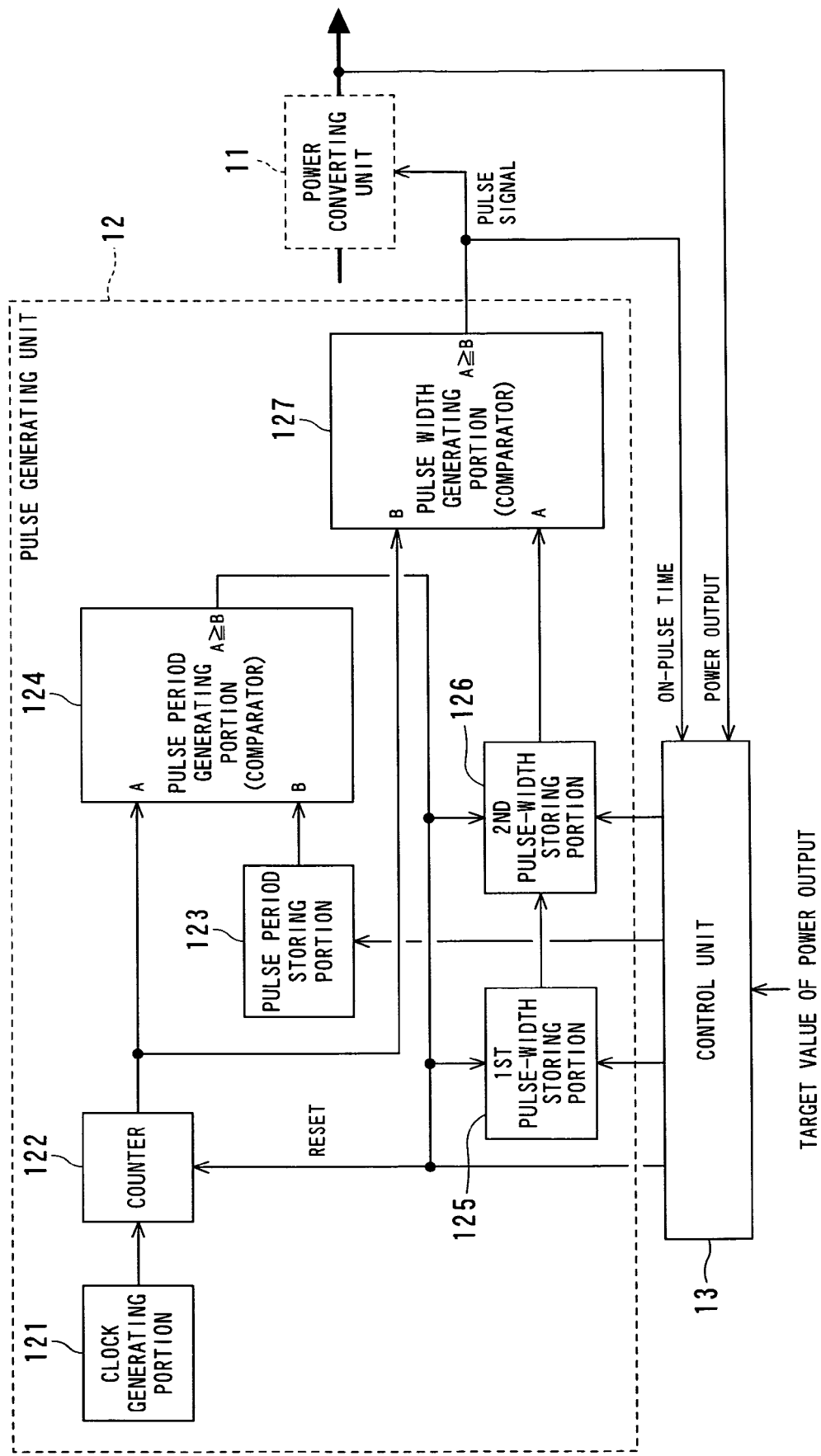
FIG. 4 is a diagram showing an example of the structure of a pulse generating unit in the power supply device according to the embodiment of the present invention.

FIG. 4 is a diagram showing the detailed structure of the pulse generating unit 12.

The pulse generating unit 12 includes a clock generating portion 121 that generates a clock signal with a proper frequency, and a counter 122 that counts the clock signal.

Further, the pulse generating unit 12 includes a pulse period storing portion 123, and a pulse period generating portion 124. The pulse period of the pulse signal PS is determined by the pulse period storing portion 123 and the pulse period generating portion 124.

The pulse period generating portion 124 is a comparator, one input-terminal A of the pulse period generating portion 124 is connected to an output terminal of the counter 122, and another input-terminal B is connected to an output terminal of the pulse period storing portion 123. An output terminal of the pulse period generating portion 124 is connected to a reset terminal of the counter 122.

Further, the pulse generating unit 12 includes a first pulse-width storing portion 125, a second pulse-width storing portion 126, and a pulse width generating portion 127. The pulse width of the pulse signal PS is determined by the first pulse-width storing portion 125, the second pulse-width storing portion 126, and the pulse width generating portion 127.

The pulse width generating portion 127 is a comparator, one input-terminal B of the pulse width generating portion 127 is connected to an output terminal of the counter 122, and another input-terminal A is connected to an output terminal of the second pulse width storing portion 126. An output terminal of the first pulse-width storing portion 125 is connected to an input terminal of the second pulse-width storing portion 126.

An output signal of the pulse width generating portion 127 is just the pulse signal PS, and the pulse signal PS is input to the switching portion 111 of the power converting unit 11. Further, the pulse signal PS is input to the control unit 13 so as to determine whether or not the period is an ON-pulse time.

The control unit 13 calculates a pulse period and a pulse width, the calculated pulse period is output to the pulse period storing portion 123, and the calculated pulse width is output to the first pulse-width storing portion 125 and the second pulse-width storing portion 126. In this case, in order to match with the output of the counter 122, the pulse period and the pulse width are output on the unit basis of the clock period.

In addition, the control unit 13 outputs a reset signal of the counter 122.

(2) Operation of Power Supply Device

A description is given of the operation of the power supply device 10 with the above-mentioned structure, in particular, the operation for generating the pulse signal PS, as an important element for responsiveness of the control operation for voltage stabilization with reference to FIGS. 4 to 8B.

The control operation for voltage stabilization can be performed by changing both the pulse width and the pulse period or one of them. According to the embodiment, the control operation for voltage stabilization is performed by changing only the pulse width while fixing the pulse period.

Figure 5:
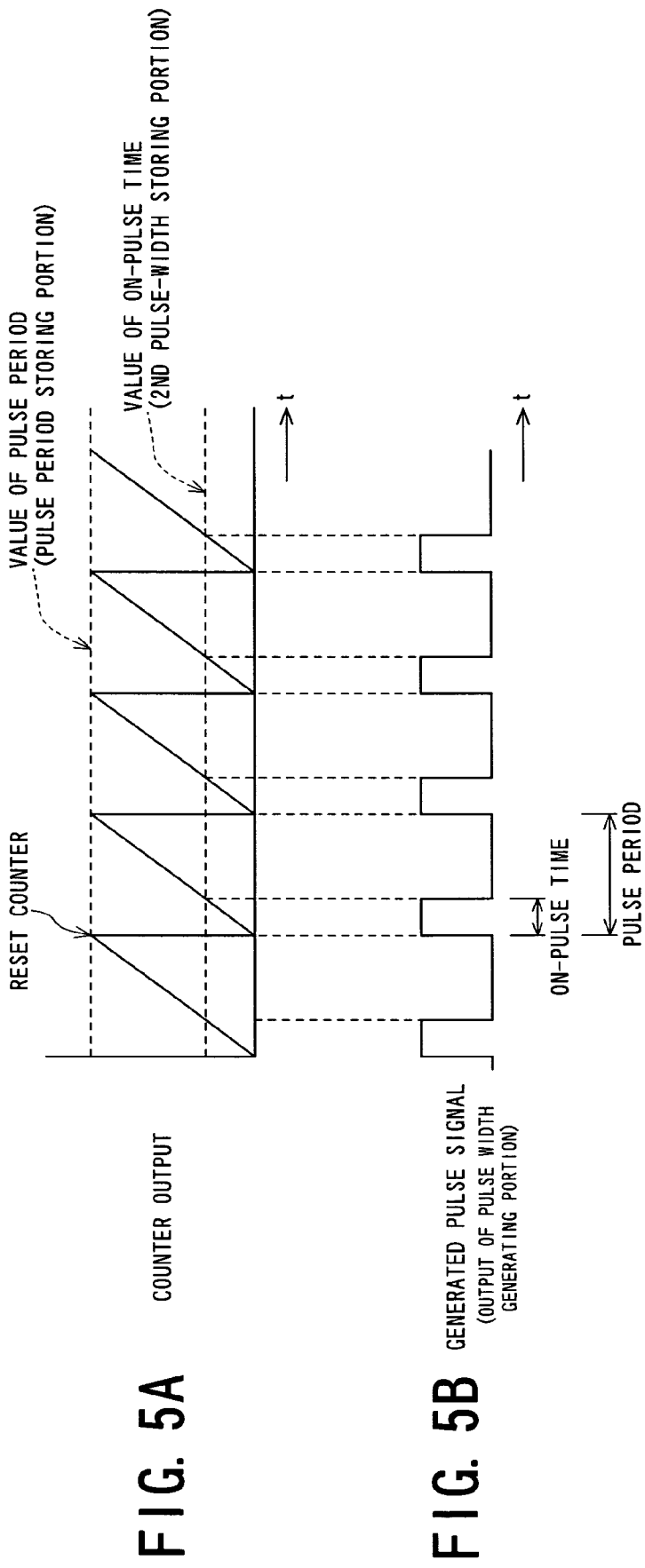
FIGS. 5A and 5B are explanatory diagrams of a constant-pulse signal generating method without the change in load.

First, a description is given of a method for generating the pulse signal PS when the output of the power supply device 10 matches a reference value (target value) and is always stable with reference to FIGS. 4 to 5B.

In the initial state, the control unit 13 sets the value of a predetermined pulse period to the pulse period storing portion 123. Similarly, the control unit 13 sets a predetermined pulse-width, i.e., a value of the ON-pulse time to the first pulse-width storing portion 125.

The counter 122 can be configured as an up-counter or a down-counter. According to the embodiment, the counter 122 is configured to be an up-counter.

The clock signal is input to the counter 122. Subsequently, the output of the counter 122 is counter-up, starting from zero, as shown by a waveform at the left end in FIG. 5A. Referring to FIG. 4, the output of the counter 122 is input to the one input-terminal A of the pulse period generating portion 124.

On the other hand, the value of the pulse period set by the control unit 13 is input to the other input-terminal B of the pulse period generating portion 124. The pulse period generating portion 124 outputs a signal when the input A matches the input B or when the input A is over the input B.

Therefore, the pulse period generating portion 124, serving as a comparator, outputs a signal when the output value of the counter 122 matches the value of the pulse period. The signal is connected to a reset terminal of the counter 122. Therefore, the output value of the counter 122 matches the value of the pulse period and, simultaneously, the counter 122 is reset to zero and restarts the count-up operation, starting from zero.

As a consequence of repeating the cycle, the output of the counter 122 indicates zigzag change, with the pulse period, as a cycle, as shown in FIG. 5A.

On the other hand, a signal (reset signal) output from the pulse period generating portion 124 is connected to the first pulse-width storing portion 125 and the second pulse-width storing portion 126. The first pulse-width storing portion 125 and the second pulse-width storing portion 126 are configured to transfer the value of the first pulse-width storing portion 125 to the second pulse-width storing portion 126 by the reset signal. Thus, when the counter 122 is reset, a value of the ON-pulse time (pulse width) set to the first pulse-width storing portion 125 is simultaneously transferred to the second pulse-width storing portion 126.

The output value of the counter 122 is input to the one input-terminal B of the pulse width generating portion 127 (comparator), and the output of the second pulse-width storing portion 126 is input to the other input-terminal A. Similarly to the pulse period generating portion 124, the pulse width generating portion 127 outputs a signal when the value of the input A matches the value of the input B or when the value of the input A is higher than the value of the input B.

Thus, referring to FIG. 5B, the pulse width generating portion 127 outputs the pulse signal PS having a pulse width corresponding to the value of the ON-pulse time set (transferred) to the second pulse-width storing portion 126. Since the operation is repeated every pulse period, the pulse width generating portion 127 sequentially outputs the pulse signal PS having the pulse width and the pulse period set, as the pulse elements, from the control unit 13.

Next, a description is given of the operation in which the output of the power supply device 10 is fluctuated and the output of the power supply device 10 is deviated from the reference value (target value) with reference to FIGS. 4 and 6 to 8B.

Figure 6:
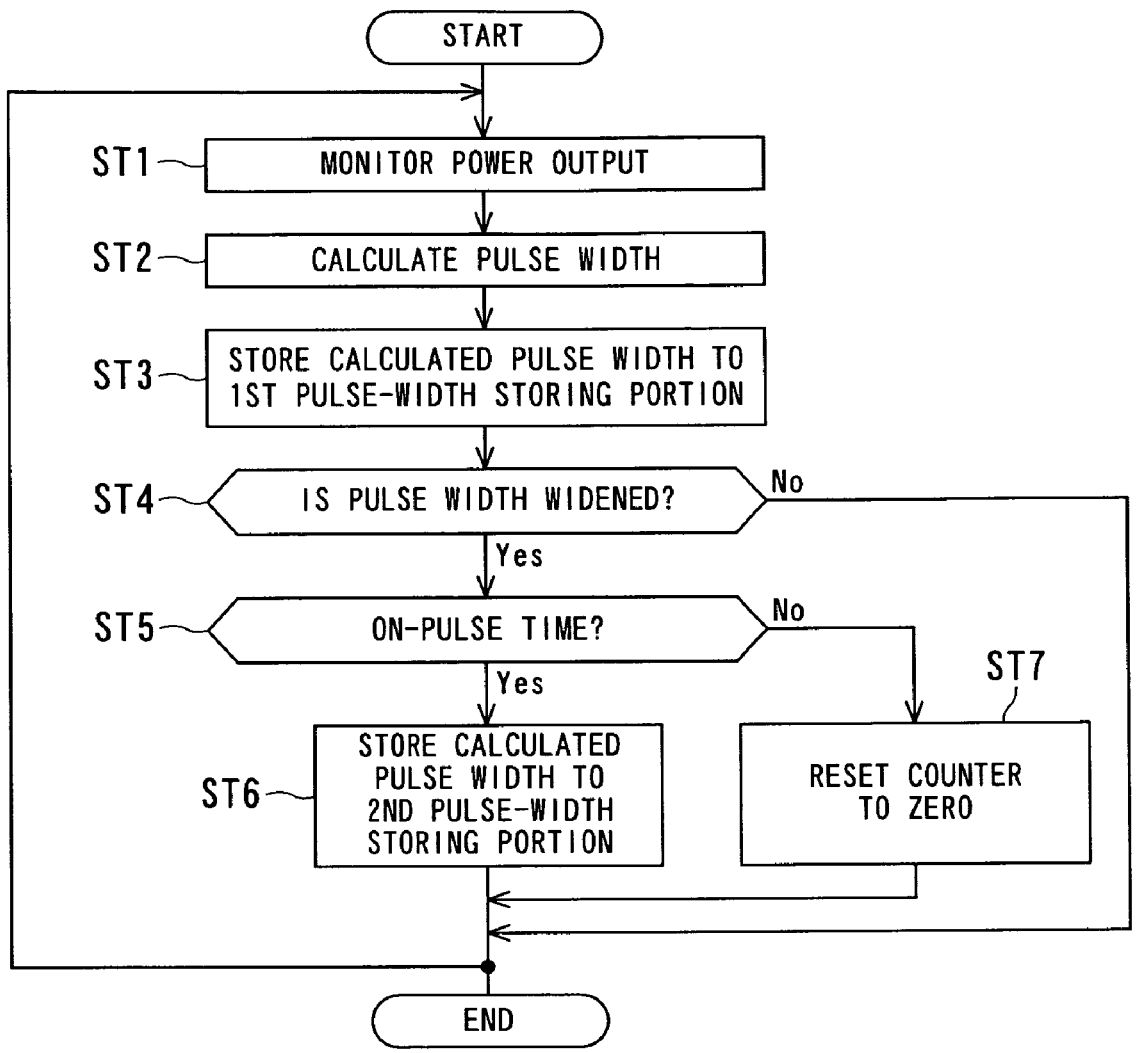
FIG. 6 is a flowchart showing a processing example of a control unit in the power supply device according to the embodiment of the present invention.

FIG. 6 is a flowchart showing processing of the control unit 13.

A DC power output of the power converting unit 11 is fedback and is input to the control unit 13. The control unit 13 always monitors a voltage value of the fedback DC power output or the voltage value and current value (in step ST1 in FIG. 6).

In step ST2, the control unit 13 calculates a new pulse-width on the basis of the monitored DC power output value. Specifically, the control unit 13 compares the DC power output value with the reference value (target value of the power output) of the power output. The control unit 13 calculates the pulse-width so that the pulse width is widened when the DC power output value is lower than the reference value of the power output and, on the contrary, the pulse width is narrowed when the DC power output value is higher than the reference value of the power output. Further, when the DC power output value matches the reference value of the power output, the control unit 13 sets the same previous pulse-width, as a new pulse-width.

Subsequently, in step ST3, the calculated new pulse-width is stored in the first pulse-width storing portion 125.

In step ST4, the calculated new pulse-width is compared with the previous pulse-width. When the calculated new pulse-width is the same as the previous pulse-width or is smaller than it, the processing in steps ST5 to ST7 is bypassed, and the processing returns to step ST1.

Here, a case in which the calculated new pulse-width is the same as the previous pulse-width means that the power output value matches the power reference value. As mentioned above, the value of the ON-pulse time (pulse width) set to the first pulse-width storing portion 125 is transferred to the second pulse-width storing portion 126 every reset timing of the counter 122, thereby constantly generating the pulse signal ps.

Meanwhile, a case in which the calculated new pulse-width is smaller than the previous pulse-width means that the power output value is higher than the power reference value. In this case, the value of the new pulse-width set to the first pulse-width storing portion 125 in step ST3 is transferred to the second pulse-width storing portion 126 every reset timing of the counter 122.

Therefore, when the setting timing to the first pulse-width storing portion 125 from the control unit 13 is deviated from the reset timing of the counter 122, the pulse signal PS with the new (small) pulse width is generated with the delay corresponding to deviated timing.

However, generally, the case in which the power output value has become higher than the power reference value indicates that the consumption current on the load side has been reduced. In this case, from the view-point of the power-supply side, there is a margin. Namely, an allowable range is relatively larger than the contrary state (the consumption current on the load sharply increases) in view of the responsiveness of the control for stabilization. Thus, even if the timing for actually generating the pulse signal PS is slightly delayed from the instructing timing, this is allowable in many cases.

On the other hand, when the consumption current on the load side sharply increases, the high responsiveness is demanded.

In the processing in steps ST5 to ST7, the high responsiveness is realized when the consumption current on the load side sharply increases and the calculated new pulse-width is larger than the previous pulse-width.

In step ST4, it is determined that the calculated new pulse-width is in the direction for widening the previous pulse-width (YES in step ST4). Subsequently, the processing advances to step ST5.

In order to realize the high responsiveness, the embodiment provides a method for obtaining the pulse signal PS having a new (wide) pulse width simultaneously with the instructing timing to the pulse generating unit 12. The processing is different depending on whether or not the instruction to the pulse generating unit 12 occurs during the ON-pulse time.

When the instructing timing to the pulse generating unit 12 from the control unit 13 is during the ON-pulse time, the value of the calculated new (wide) pulse-width is directly stored to the second pulse-width storing portion 126 (not via the first pulse-width storing portion 125) (in step ST6).

As a consequence thereof, referring to FIGS. 7A and 7B, even if the instructing timing to the pulse generating unit 12 from the control unit 13 is during the ON-pulse time, the pulse signal PS with a new pulse-width is generated from the instructing timing without delay on the basis of the set new-value of the second pulse-width storing portion 126.

On the other hand, when the instructing timing to the pulse generating portion 12 from the control unit 13 is during a period except for the ON-pulse one (that is, OFF-pulse time), the control unit 13 forcedly outputs a reset signal to the counter 122 (in step ST7).

The reset signal resets the counter 122 to zero, and a new pulse-period starts from the instructing timing. Further, the reset signal is connected to the first pulse-width storing portion 125 and the second pulse-width storing portion 126, and the reset signal transfers the value of a new (wide) pulse width stored in the first pulse-width storing portion 125 (in step ST3) to the second pulse-width storing portion 126.

As a consequence thereof, referring to FIGS. 8A and 8B, even if the instructing timing to the pulse generating unit 12 from the control unit 13 is during the OFF-pulse time, the pulse signal PS with the set new (wide) pulse-width is generated from the instructing timing without delay.

With the power supply device 10, the information processing apparatus 1 including the power apparatus 10, and the power control method according to the embodiment, upon generating the pulse signal PS on the basis of the new pulse width calculated so as to stabilize the output DC power in the control unit 13, it is possible to immediately generate the new pulse-signal ps without delay from the instructing timing from the control unit 13, irrespective of the ON-pulse time and the OFF-pulse time.

Thus, even upon sharply increasing the load current of the components of the information processing apparatus main-body 20, such as a CPU, the power can be stably supplied with excessively high responsiveness.

The present invention is not limited to the embodiment, and can be modified without departing from the essentials thereof. Further, various invention can be embodied by properly combining a plurality of components disclosed according to the embodiment. For example, some components from all the components according to the embodiment may be deleted. Further, the components according to different embodiments may be properly combined.

What is claimed is:

1. A power supply device comprising:
a power converting unit that switches DC power on the basis of a pulse signal having a predetermined ON-pulse time and a predetermined pulse period, as pulse elements, thereafter smoothes the switched power, and outputs a predetermined power-supply voltage;
a control unit that calculates a new pulse-element on the basis of an output of the power converting unit; and
a pulse generating unit that generates the pulse signal on the basis of the new pulse-element instructed from the control unit,
wherein the pulse generating unit generates the pulse signal of the new pulse-element from the instructed timing without waiting for a new pulse-period, irrespective of the ON-pulse time and an OFF-pulse time, even if the instructed timing is at any timing during the pulse period,
wherein the pulse generating unit comprises:
a counter that inputs a predetermined clock signal and counts the number of clocks;
a pulse period storing portion that stores a value of the pulse period;
a pulse period generating portion that compares a count value of the counter with the pulse period stored in the pulse period storing unit and resets the count value of the counter every pulse period;
a first pulse-width storing portion that stores a value of the ON-pulse time;
a second pulse-width storing portion that receives the value of the ON-pulse time transferred from the first pulse-width storing portion and stores the value of the ON-pulse time, when the count value is reset; and a pulse width generating portion that compares the count value of the counter with the value of the ON-pulse time stored in the second pulse-width storing portion, determines the ON-pulse time on the basis of the comparison of both the values, and generates the pulse signal on the basis of the determined ON-pulse time, and wherein the control unit stores the value of the ON-pulse time to the first pulse-width storing portion, directly stores a value of a pulse width to be changed to the second pulse-width storing portion not via the first pulse-width storing portion, upon issuing an instruction for changing the pulse with during the ON-pulse time, and forcedly resets the count value of the counter upon issuing the instruction for changing the pulse width during the OFF-pulse time.

2. A power supply device according to claim 1, wherein the counter is an up-counter, and the counter is reset by resetting the count value to zero.

3. A power supply device according to claim 1, wherein the control unit comprises a DSP.

4. An information processing apparatus comprising:
an information processing apparatus main-body that performs predetermined information-processing; and
a power supply device that supplies power to the information processing apparatus main-body,
wherein the power supply device comprises:
a power converting unit that switches DC power on the basis of a pulse signal having a predetermined ON-pulse time and a predetermined pulse period, as pulse elements, thereafter smoothes the switched power, and outputs a predetermined current voltage;
a control unit that calculates a new pulse-element on the basis of an output of the power converting unit; and
a pulse generating unit that generates the pulse signal on the basis of the new pulse-element instructed from the control unit, and
wherein the pulse generating unit generates the pulse signal of the new pulse-element from the instructed timing without waiting for a new pulse-period, irrespective of the ON-pulse time and an OFF-pulse time, even if the instructed timing is at any timing during the pulse period,
wherein the pulse generating unit comprises:
a counter that inputs a predetermined clock signal and counts the number of clocks;
a pulse period storing portion that stores a value of the pulse period;
a pulse period generating portion that compares a count value of the counter with the pulse period stored in the pulse period storing unit and resets the count value of the counter every pulse period;
a first pulse-width storing portion that stores a value of the ON-pulse time:
a second pulse-width storing portion that receives the value of the ON-pulse time transferred from the first pulse-width storing portion and stores the value of the ON-pulse time, when the count value is reset; and
a pulse width generating portion that compares the count value of the counter with the value of the ON-pulse time stored in the second pulse-width storing portion, determines the ON-pulse time on the basis of the comparison of both the values, and generates the pulse signal on the basis of the determined ON-pulse time, and wherein the control unit stores the value of the ON-pulse time to the first pulse-width storing portion, directly stores a value of a pulse width to be changed to the second pulse-width storing portion not via the first pulse-width storing portion, upon issuing an instruction for changing the pulse with during the ON-pulse time, and forcedly resets the count value of the counter upon issuing the instruction for changing the pulse width during the OFF-pulse time.

5. An information processing apparatus according to claim 4, wherein the counter is an up-counter, and the counter is reset by resetting the count value to zero.

6. An information processing apparatus according to claim 4, wherein the control unit comprises a DSP.

7. A power control method comprising:
switching DC power on the basis of a pulse signal having a predetermined ON-pulse time and a predetermined pulse period, as pulse elements;
smoothing the switched power;
calculating a new pulse-element on the basis of the smoothed power output; and
generating the pulse signal of the new pulse-element from the instructed timing for generating the pulse signal on the basis of the calculated new pulse-element without waiting for a new pulse-period, irrespective of the ON-pulse time and an OFF-pulse time, even if the instructed timing is at any timing during the pulse period,
wherein the generating the pulse signal step comprises:
inputting a predetermined clock signal and counting the number of clocks with a counter;
comparing a count value of the counter with a value of the pulse period stored in advance and resetting the count value of the counter every pulse period;
storing a value of the ON-pulse time to a first pulse-width storing portion;
transferring and storing the value of the ON-pulse time stored in the first pulse-width storing portion to a second pulse-width storing portion, upon resetting the count value; and
comparing the count value of the counter with the value of the ON-pulse time stored in the second pulse-width storing portion, determining the ON-pulse time on the basis of the comparison of both the values, and generating the pulse signal on the basis of the determined ON-pulse time, and
wherein, upon generating the pulse signal on the basis of the new pulse-element,
a value of a pulse width to be changed is directly stored to the second pulse-width storing portion not via the first pulse-width storing portion, upon issuing an instruction for changing the pulse width during the ON-pulse time, and
the count value of the counter is forcedly reset upon issuing the instruction for changing the pulse width during the OFF-pulse time.

8. A power control method according to claim 7 wherein the counter is an up-counter, and the counter is reset by resetting the count value to zero.

* * * * *